July 22, 1941.  J. SCHMUTZ  2,250,397
TYPE INKING ROLLER AND MOUNTING
Filed May 26, 1938
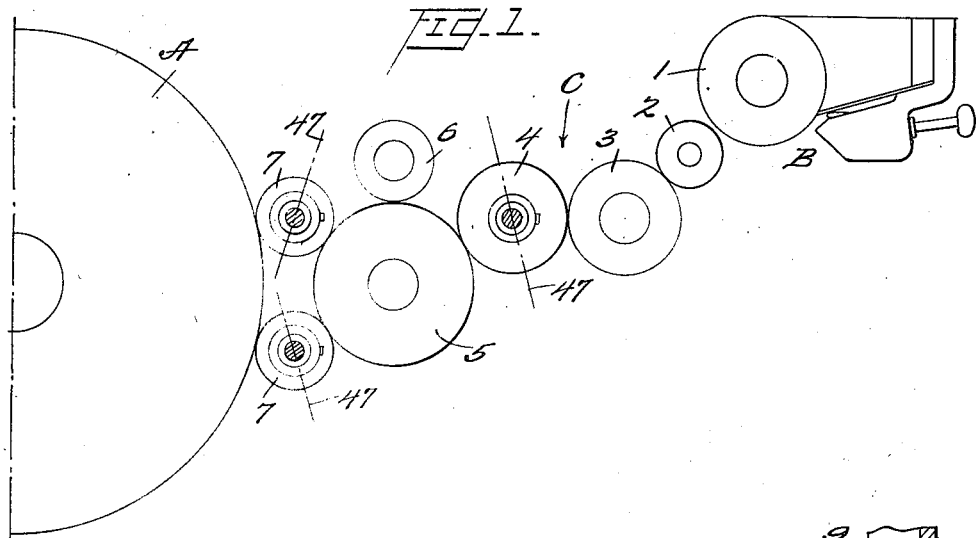
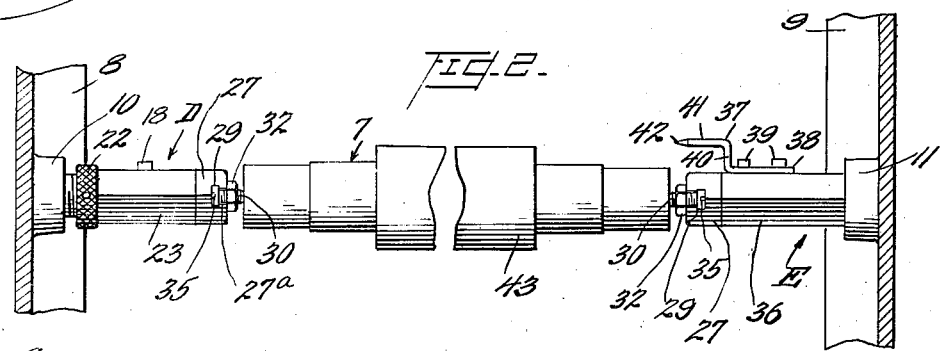
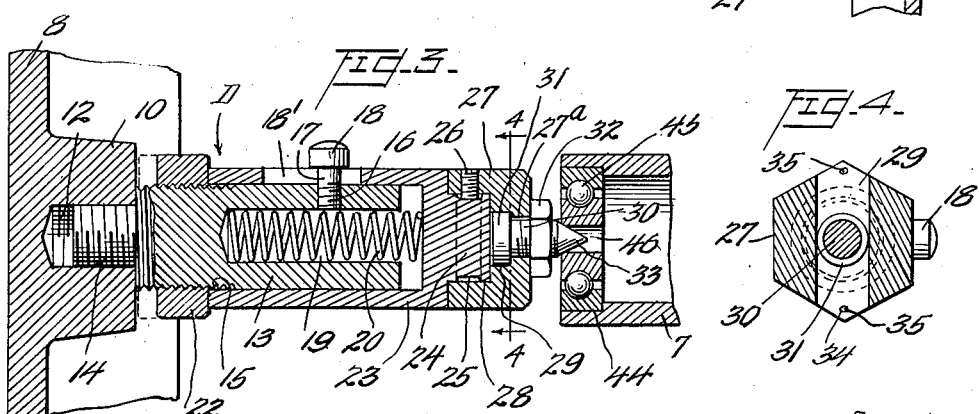
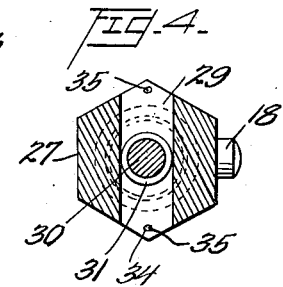
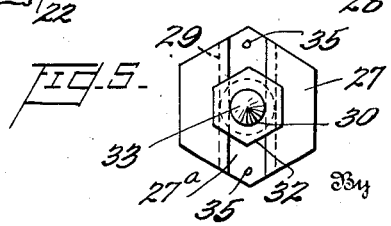
Inventor
Julius Schmutz
Shrer, Crowe Gordon
Attorney Patented July 22, 1941

2,250,397

UNITED STATES PATENT OFFICE 2,250,397

TYPE INKING ROLLER AND MOUNTING

Julius Schmutz, Louisville, Ky.

Application May 26, 1938, Serial No. 210,210

11 Claims. (Cl. 308—58)

Generically this invention relates to a method and apparatus for securing better inking of printing presses but it is more particularly directed to the manner of adjustably mounting the type inking rollers.

One of the principal objects of this invention is the provision of inking rollers mounted on ball bearings and employing center bearings coacting with the ball bearings for operatively supporting said rollers.

Another important object of this invention is the provision of center bearings for normally supporting an inking roller, means operatively associated with said center bearings to permit sufficient removal of the inking roller from the printing cylinder to permit thorough washing and cleaning of the press and roller, to maintain the roller in such position, so as to readily permit operative replacement of the roller and to secure it in such position as desired.

Another important object of this invention is the provision of center bearings and supporting stud structures operable to exert the proper tension against the ball bearings thereby preventing any oscillating of the type inking roller over the face of the type causing the ink to run along the edges of the type and effect bad printing and offset, as has heretofore been prevalent.

A further important object of this invention is the provision of ball bearing type inking rollers riding on centers, and resilient means for adjusting the center bearings to prevent play or wear and vibration after the roller is operatively positioned, and eliminating tendency of cramped bearings which causes heating and melting down of the composition rollers, thereby not only effecting a great saving with respect to the composition rollers but enabling operation of the press at higher speed and without roller play in any direction so as to secure better inking without smearing the ink on the sides of the characters or of the lettering, and additionally effecting a saving in ink.

Another important object of this invention is the provision of means of mounting composition inking rollers on center bearings, and supporting means for said center bearings so designed as to permit ready and off center adjustment of the bearings, with respect to said supports to effect adjustment of the composition type inking rollers with respect to the type cylinders and distributing roller as desired.

With these and other objects in view, which will become apparent as the description proceeds, the invention resides in the construction, combination and arrangement of parts, hereinafter more fully described and claimed, and illustrated in the accompanying drawing, in which like characters of reference indicate like parts throughout the several figures, of which:

Fig. 1 is a diagrammatic view of the printing cylinder, inking fountain, and inking roller assembly.

Fig. 2 is a fragmentary elevation of the composition inking roller and mounting with portions of the supporting printing press frame partly in section.

Fig. 3 is a longitudinal sectional view of the adjustable stud structure and portion of composition inking roller.

Fig. 4 is a cross section taken on the line 4—4 of Fig. 3 looking in the direction of the arrows.

Fig. 5 is a detail end view of one of the stud elements showing the position of the tapper pins.

The printing press and inking roller structures with which I am familiar have proven deficient in several respects, among which are: the difficulty in preventing oscillation of the type inking roller over the face of the type which causes running of the ink along the edges of the type, thus causing smudging; inability to take up play or wear in all directions so as to prevent vibration of the roller, especially when running at high speed, since unless the roller runs prefectly true it tends to effect dragging with respect to the type with a consequent wastage of ink and poor printing; and with the construction heretofore in use the removal of the composition roller for cleaning and the like has been attended with more or less difficulty, and it was to provide means for expeditiously effecting complete or partial removal of the type inking or composition roller and maintaining it in the latter position for cleaning, etc., and means for automatically seating the supporting center bearing elements with the proper tension to take up wear and to prevent oscillation of the roller, said means being adjustable with respect to the frame and additionally, and operable to effect adjustment of the type inking or composition rollers in all directions with respect to the type cylinder and ink distributing means that I designed the apparatus, including the adjustable supporting stud and center bearing structures, forming the subject matter of this invention.

In the illustrated embodiment characterizing this invention there is shown a type cylinder A, ink fountain structure B, and inking chain or roller assembly C, said assembly C comprising fountain roller 1, composition transfer roller 2, inking roller 3, composition inking roller 4, distributing roller 5, composition oscillating inking roller 6, and composition type inking rollers 7, the latter and their mountings will now be described in detail.

In order to obtain good clear-cut printing it is important that the type ink roller or rollers 7 have a true non-vibrating operating contact with the type cylinder A and that they be readily adjustable so as to reduce the time consumed in stoppage of the press to a minimum, and as the type and rollers require frequent washing or cleaning it is important that the respective rollers be sufficiently removed from contact with the type cylinder and maintained in such position to permit the cleaning operation, and adapted to be easily returned to operative position and automatically seated with respect to the center bearings so that at no time during the life of the roller is it subject to lost motion by wear and tear, and which has been accomplished by the adjustable bearing and supporting mounting for the roller now to be described. Since such mounting may be similar in connection with more than one inking roller, for brevity of description, only one will be described in detail.

Opposite frame members 8 and 9 are formed with aligned lugs 10 and 11 which are threadedly countersunk as at 12, and are adapted to support the adjustable stud structures D and E.

The stud structure D comprises a core or body 13 terminating at one end in a reduced threaded screw portion 14 adjustably and threadedly engageable in bore 12 for supporting the stud at right angles to the frame 8. The body portion 13 is externally threaded adjacent to portion 14 as at 15 and is formed at one side with a threaded opening 16 adapted to receive the threaded stem 17 of screw bolt 18. Said body is formed in its free end with a central longitudinal bore 19 in which is mounted compression spring 20 with its free end normally extending beyond the end of said body 13 for a purpose directly more fully appearing.

Mounted on said body portion 13 engageable with threads 15 is a knurl nut 22. A hexagonal casing 23 formed with a slot 18' is telescopically mounted on body 13 and normally seating against nut 22, the free end of said casing terminating in a reduced cylindrical portion 24 formed with an annular groove or recess 25 adapted to receive the inner end of locking screw 26 threadedly mounted in adjustable head 27 internally bored as at 28 to receive the cylindrical portion 24 on which it is mounted, said head being rotatably adjustable with respect to said casing 23 and adapted to be firmly secured in any adjusted position by the screw 26 as will be apparent without further description. Head 27 is formed in its end with a slot 27a terminating at its bottom in a wider slot 29. A center bearing member 30 is adapted to extend through said slot 27a with its head 31 engageable in slot 29, and has a nut 32 threadedly mounted thereon engageable with the face of head 27 to firmly secure it in any adjusted position with respect to said head, and its free end is formed with a cone shaped bearing surface 33 for a purpose hereinafter more fully appearing.

In order to prevent complete disengagement of center bearing member 30 from head 27, slot 29 is formed adjacent each end with a countersunk bore 34 adapted to receive a tapper pin 35. The right hand stud E mounted in lug 11 opposite the stud D is formed with a solid body 36 conforming in configuration to the combined body 13 and casing 23 of stud D, and terminating at one end is a reduced threaded screw portion 14 for engagement with bore 12 similar to stud D. The free end of body 36 is formed with a reduced cylindrical portion 24 having an annular groove or recess 25 adapted to receive the inner end of locking screw 26 threadedly mounted in adjustable head 27, and as the construction and operation of said head is identical to head 27 described in connection with stud D, further detailed description is deemed unnecessary.

An anchor or substitute center member 37 is mounted on stud E and is formed with a base portion 38 suitably apertured to receive the set screws 39 threadedly extending in suitably threaded openings formed in body 36, similar to opening 16 in member 13, firmly securing member 37 in position. Member 37 extends upwardly from one end of base 38 forming portion 40 and then at right angles in parallel relation with respect to bearing member 30 forming portion 41, which terminates at its free end in the cone shaped or tapered end 42 substantially similar to surface 33 of bearing 30, and constituting a substitute center or anchor member offset with respect to bearing 30 and adapted to support one end of roller 7 when the latter is positioned thereon for cleaning and the like, as will hereinafter appear.

The composition inking roller 7 having mounted thereon composition cover 43 is countersunk at each end as at 44 to receive the ball bearing assembly 45 having a central bearing opening 46 adapted to respectively receive the bearing portions 33 of center bearing members 30 on which said roller is mounted when operatively positioned as shown in Fig. 2. At this point it will be noted that lines 47 represent the position of grooves 27a and the line of adjustment of roller 7 when the rollers are positioned as shown in Fig. 1; however these lines of adjustment may be varied by adjusting heads 27 of studs D and E, as will hereinafter be more fully explained.

While the operation of the mechanism is thought to be clear from the above description it might be well to further state that to operatively mount roller 7 on studs D and E it is only necessary to initially loosen nut 22 in the direction of lug 10 and loosen bolt 18 permitting casing 23 to be extended with respect to body 13 to the limit of slot 18' and then engage center bearing 30 in opening 46 at one end of the roller and moving head 27 back against the compression of spring 20, and said spring will maintain pin 30 in bearing position with respect to bearing 45 as the roller is moved forward to be operatively positioned on pin 30 of stud E, so that when the roller is thus positioned the proper tension of center bearings 30 with respect to the roller will be automatically effected, and locked in such properly adjusted position by actuation of knurl nut 22 into contact with casings 23 and tightening screw bolt 18, thereby securely locking the casing with respect to body 13 and the roller in operative position.

To remove the roller it is only necessary to loosen nut 22 and bolt 18 and move roller 7 in spring depressing direction sufficiently to remove the roller from bearing 30 of stud E and then from bearing 30 of stud D. In this connection it will be further observed that while heretofore it has been difficult to operatively mount roller 7 and remove the same such difficulty has been overcome by the mechanism above described, and when it is desired to wash or clean the roller 7 or reach the type cylinder for cleaning it is not necessary to completely remove the roller from its bearing supports, it only being necessary to loosen nut 22 and bolt 18 as above described and disengage the opposite end of the roller from center bearing 30 of stud E and place same on substitute bearing or anchor member 37, the opposite bearing 30 being maintained in supporting position with respect to the roller by the action of spring 20 as will be apparent, said roller adapted to be returned to operative position as above described.

In view of the above it will be seen that heads 27 are annularly adjustable with respect to studs D and E and the lines of adjustment 47 may be varied by loosening screws 26 and changing the position or direction of slots 27a as desired and then tightening said screws, and said rollers may be adjusted with respect to said lines and off center with respect to said studs by shifting bearing members 30 in slots 27a as desired.

From the above it will be apparent that I have designed a mounting for the inking rollers, wherein the bearings are self-adjustable to the proper tension to take up wear and tear so that the rollers at all times operate with a true non-drag contact with respect to the type cylinders, also permitting a wide range of adjustment of said rollers, effecting their expeditious mounting and removal and permitting cleaning of the rollers and type without their complete removal, yet presenting a mechanism simple in construction, versatile in operation, manufacturable at a minimum cost, and efficient for the purposes intended.

Although in practice I have found that the form of my invention illustrated in the accompanying drawings and referred to in the above description as the preferred embodiment is the most efficient and practical, yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. A mounting for form rollers comprising a pair of spaced center bearings, a form roller rotatably supported by said bearings and having a normal axis of rotation, and means in connection with said bearings for adjusting the bearings circumferentially and radially with respect to the normal axis of rotation of the roller.

2. A mounting for form rollers comprising a pair of spaced center bearings, a form roller rotatably supported by said bearings and having a normal axis of rotation, means for automatically seating the bearings with respect to the roller, and means in connection with said bearings for adjusting the bearings radially and effecting adjustment of the radial setting circumferentially with respect to the normal axis of rotation of the roller.

3. A mounting for form rollers comprising a pair of spaced supports, heads rotatably carried by the supports, locking means for said heads, center bearings mounted in and radially adjustable of said heads, means for effecting circumferential adjustment of the heads, a form roller rotatably supported by said bearings, and means for adjusting one of said heads longitudinally of its support.

4. A mounting for form rollers comprising a pair of spaced supports, heads rotatably adjustable on said supports, center bearings radially adjustable in said heads, means for effecting circumferential adjustment of the heads through 360°, a form roller rotatably supported by said bearings, means for spring tensioning said center bearings, and additional means in connection with one of said heads to effect longitudinal adjustment thereof.

5. A mounting for form rollers comprising a pair of spaced rotatably adjustable heads, supporting means for the heads, center bearings radially adjustable in said heads, said heads being adjustable to effect circumferential adjustment of said bearings with respect to said supports, a form roller rotatably supported by said bearings, means for adjusting one of said heads longitudinally of its supporting means, and spring tensioning means in connection with said last mentioned means.

6. A mounting for form rollers comprising a pair of rotatably adjustable longitudinally spaced heads, supports for the heads, center bearings radially adjustable in said heads, means for effecting circumferential adjustment of said heads, a form roller rotatably supported by said bearings, one of said bearings being longitudinally adjustable of its support, an anchor member mounted on one of said supports and offset with respect to its center bearing, whereby one end of said roller may be disengaged from its bearing and engaged with said anchor member.

7. A mounting for form rollers comprising a pair of rotatably adjustable longitudinally spaced heads, supports for the heads, center bearings radially adjustable in said heads, means for effecting circumferential adjustment of said heads, a form roller rotatably supported by said bearings, one of said bearings being longitudinally adjustable of its support, an anchor member mounted on one of said supports and offset with respect to its center bearing, whereby one end of said roller may be disengaged from its bearing and engaged with said anchor member, and spring means to tension said roller on said anchor member.

8. A mounting for form rollers comprising spaced supports, supporting elements carried by the supports, center bearing members carried by said elements, a form roller rotatably supported by said bearing members and having a normal axis of rotation, means for adjusting the bearings along predetermined paths radially with respect to said elements, and means for circumferentially adjusting the elements with respect to the supports, whereby the roller may be radially and circumferentially adjusted with respect to its normal axis of rotation.

9. A mounting for form rollers comprising a pair of rotatably adjustable center bearing supporting heads, supports for said heads, means for adjusting one of said heads longitudinally of its support, radially adjustable center bearings carried by said heads, means for adjusting said heads to effect circumferential adjustment of the radially adjusted bearings, and a form roller rotatably supported by said center bearings, whereby said roller may be adjusted longitudinally, radially, and circumferentially with respect to its normal axis of rotation.

10. A mounting for form rollers comprising a pair of spaced supports, one of said supports comprising telescopic sections relatively adjustable, a spring between the sections, heads rotatably carried by the supports, center bearings mounted in said heads, means for effecting radial adjustment of the bearings with respect to said heads, a form roller rotatably supported by said bearings and having a normal axis of rotation, and means for effecting circumferential adjustment of said heads, whereby radial adjustment of said bearings and their circumferential adjustment with respect to the normal axis of rotation of said roller is effected.

11. A mounting for form rollers comprising a pair of spaced supports, one of said supports comprising telescopic sections relatively adjustable, heads rotatably carried by the supports, center bearings mounted in said heads, means for effecting radial adjustment of the bearings with respect to said heads, a form roller rotatably supported by said bearings and having a normal axis of rotation, and means for effecting circumferential adjustment of said heads and radially adjusted bearings, whereby radial adjustment of said bearings and their circumferential adjustment in radially adjusted position with respect to the normal axis of rotation of said roller is effected.

JULIUS SCHMUTZ.